April 12, 1955  J. LYDFORS  2,706,082
MULTIPLIER CONTROL MECHANISM FOR SHORT CUT MULTIPLICATION
Filed July 5, 1951   5 Sheets-Sheet 1

INVENTOR
JOHN LYDFORS
By: Haseltine, Lake & Co.
AGENTS

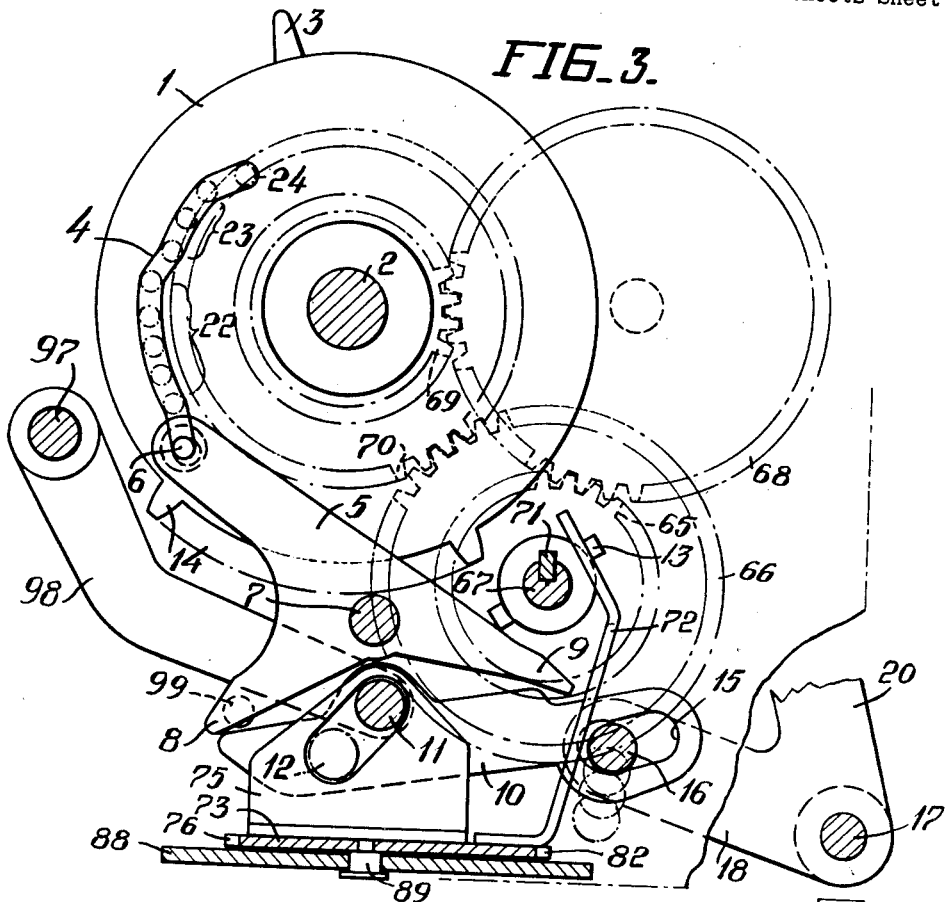

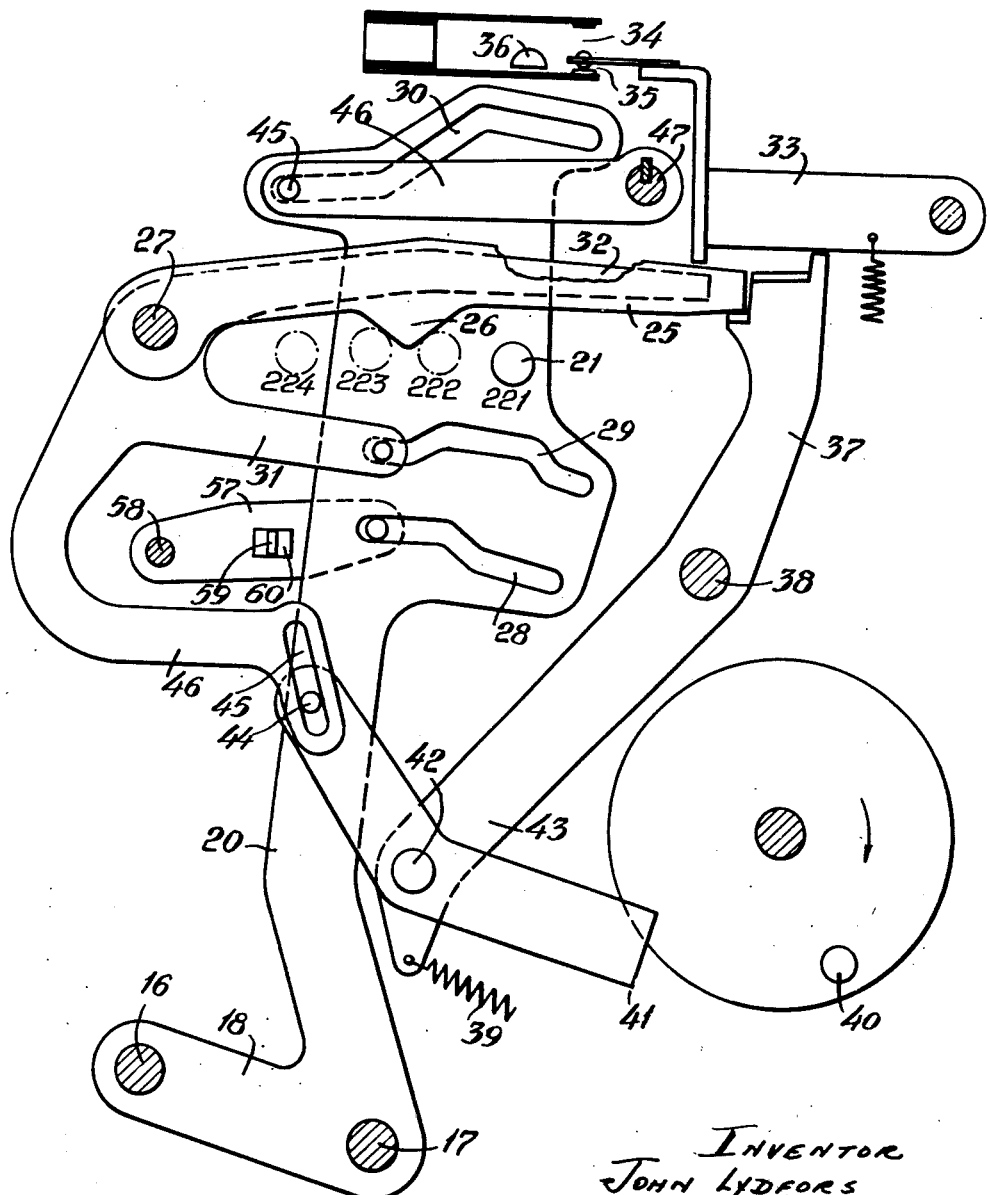
FIG_5_

April 12, 1955

J. LYDFORS 2,706,082

MULTIPLIER CONTROL MECHANISM FOR SHORT CUT MULTIPLICATION

Filed July 5, 1951

5 Sheets-Sheet 4

INVENTOR
JOHN LYDFORS
BY Vauutine, Lake & Co.
AGENTS

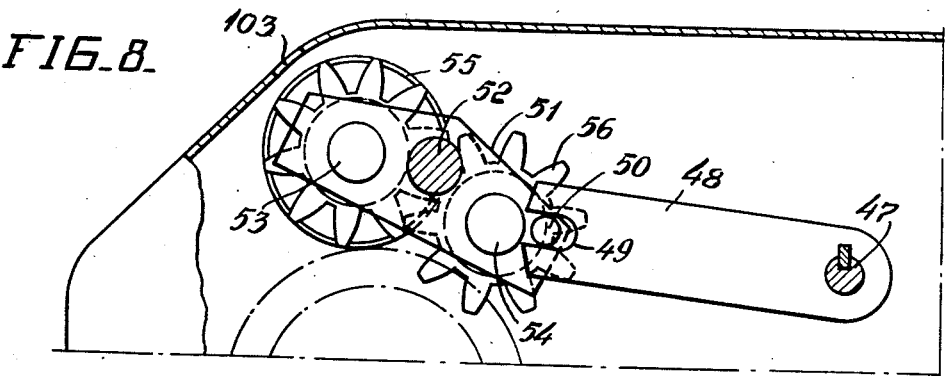
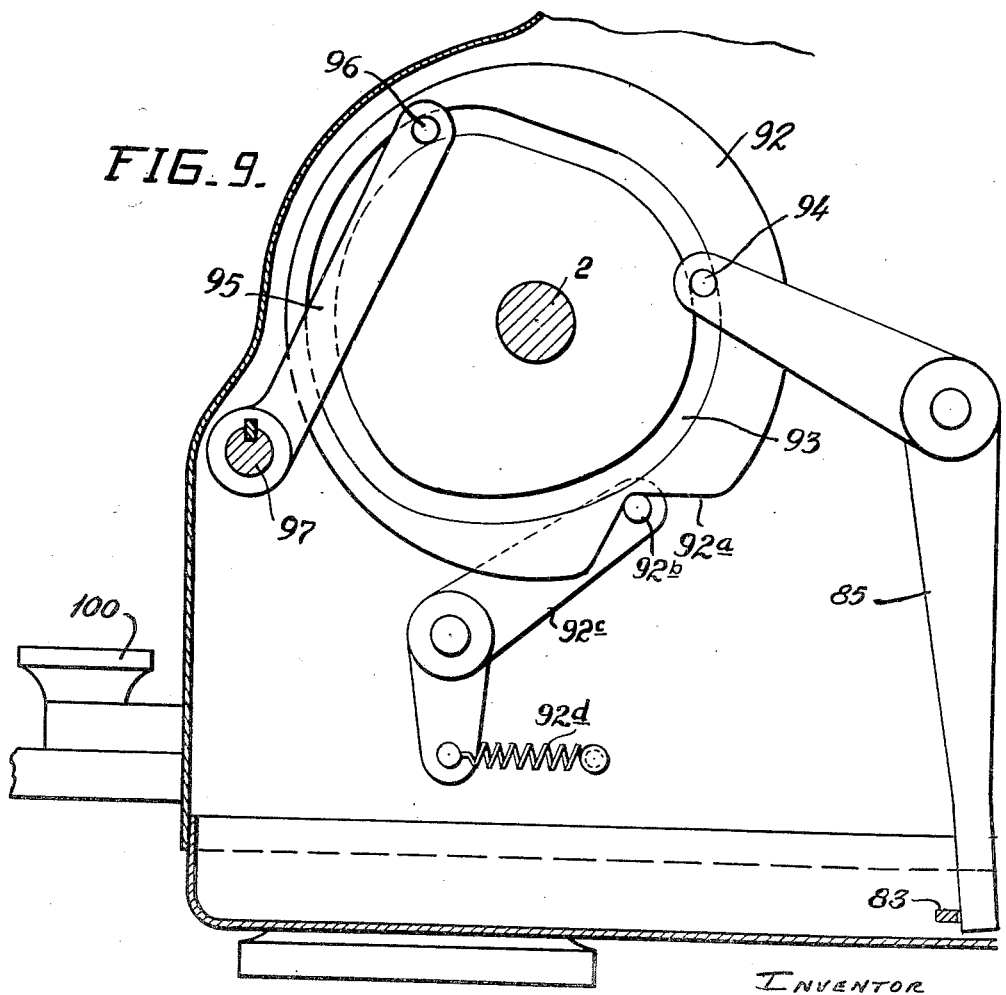

Patented Apr. 12, 1955

2,706,082

MULTIPLIER CONTROL MECHANISM FOR SHORT CUT MULTIPLICATION

John Lydfors, Eket, Sweden

Application July 5, 1951, Serial No. 235,151

4 Claims. (Cl. 235—79)

My invention has relation to improvements in calculating machines, and more particularly to automatic means for performing problems in multiplication. These means include elements in which a complete multiplier is stored, the stored multiplier digits being used successively to control a multiplicator analyzing mechanism for carrying out shortened or abbreviated multiplications.

This application is a continuation-in-part of my abandoned application Serial No. 3,395, filed January 21, 1948.

According to one feature of the invention the elements for storing the multiplier consist of a number of rotatable cam disks with successive cam surfaces, the radial distances of which corresponding to a number of groups of digits.

A further object of the invention is to provide an analyzing mechanism for such machines which is adapted to control the operation of the machine and in turn during the operating process to be driven by the operated mechanism.

The invention consists in the novel construction and combination of parts as set forth in the appended claims.

Figure 1:
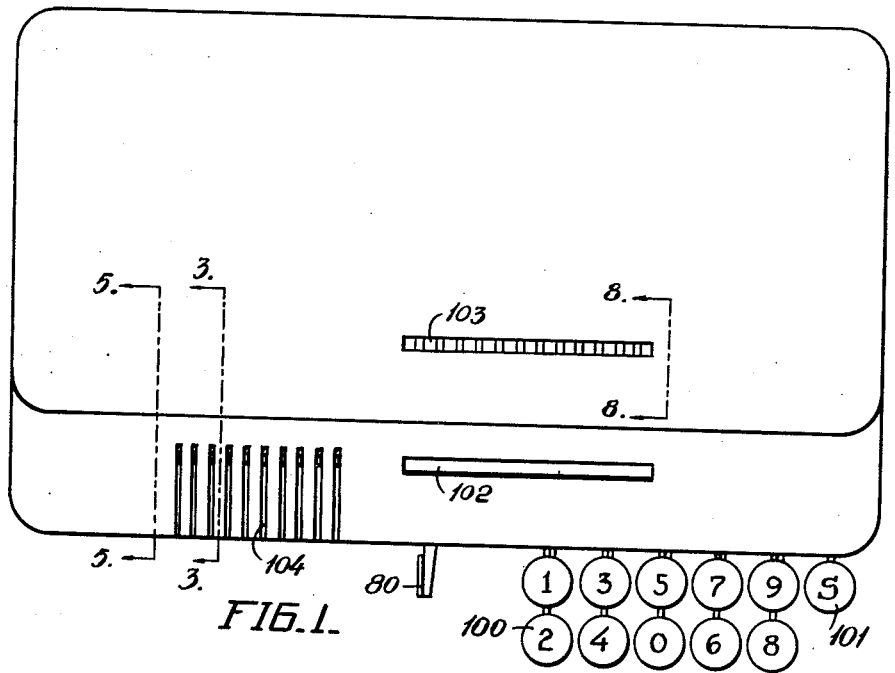
Figure 2:
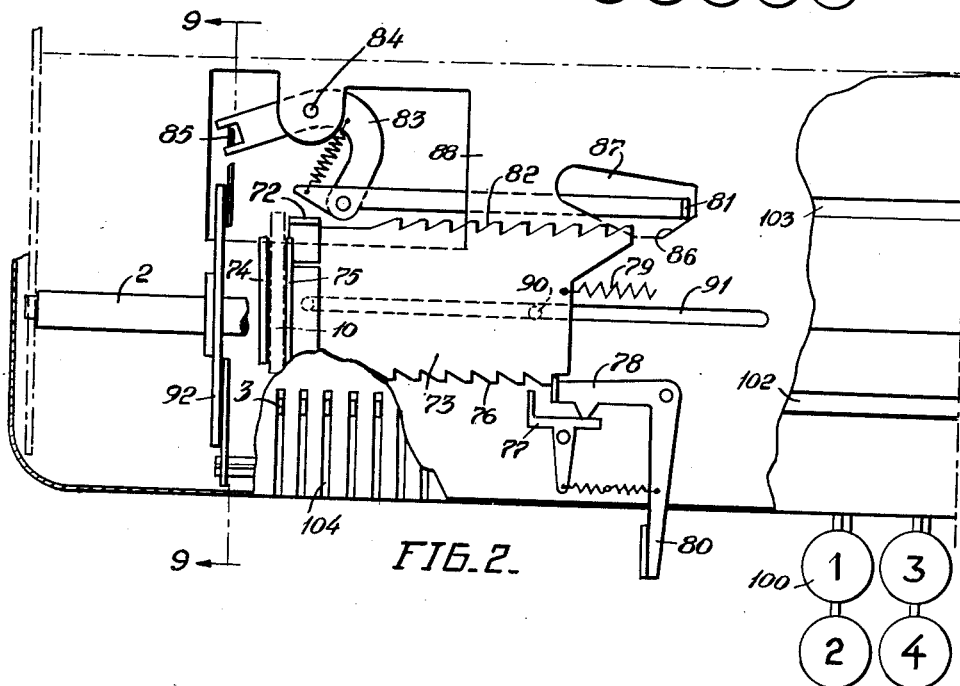
Figure 6:
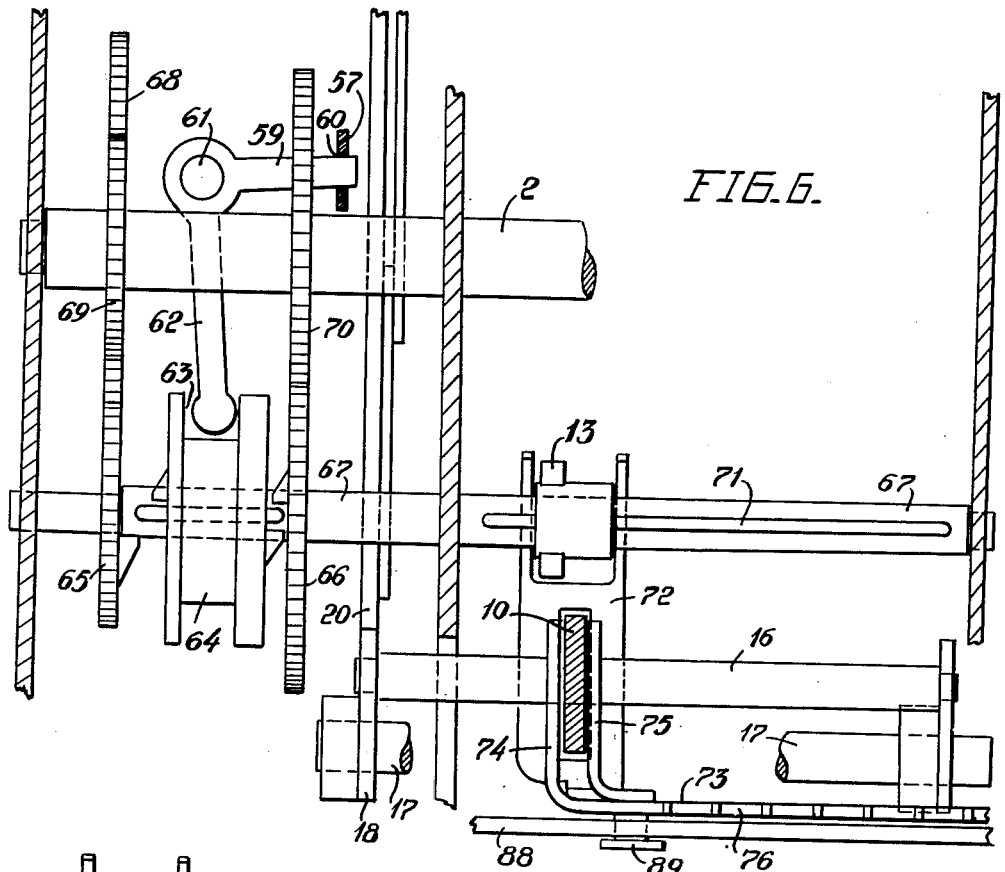
Figure 7:
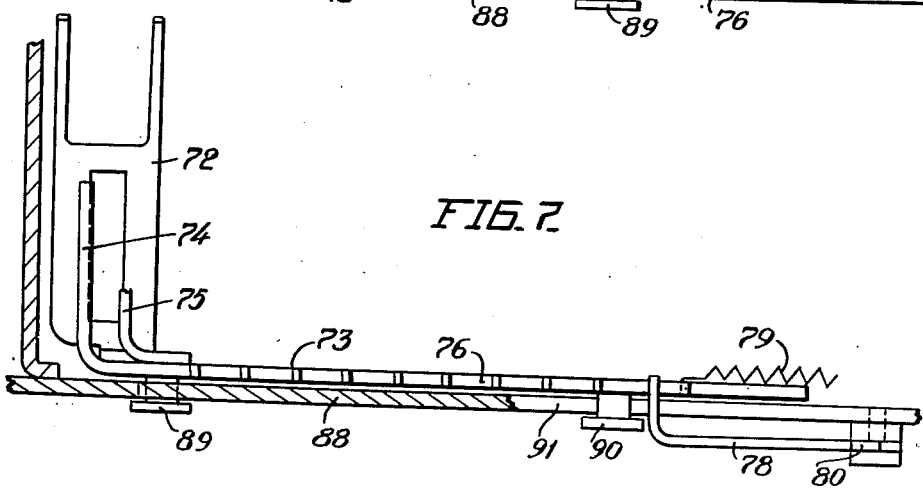

In the accompanying drawings, illustrating the invention, Figure 1 is a plan view of a calculating machine embodying the invention; Fig. 2 is a plan view in full scale of the tabulating mechanism; Fig. 3 is an enlarged section taken on the line 3—3 of Fig. 1; Fig. 4 is a plan view of the mechanism shown in Fig. 3; Fig. 5 is an enlarged section taken on the line 5—5 of Fig. 1; Fig. 6 is an enlarged front elevation of the reversing gear and the step wheel at the left front portion of the machine; Fig. 7 is an enlarged front elevation of the tabulating mechanism shown in Fig. 2; Fig. 8 is an enlarged section of the totalizer taken at the line 8—8 of Fig. 1, and Fig. 9 is an enlarged section taken at the line 9—9 in Fig. 2.

The machine, which is motor driven, comprises a totalizer, an actuator drum, a multiplying device, a multiplier analyzing mechanism, mechanisms for tabulating the actuator drum and a sensing member of the analyzing mechanism and a governing device.

The totalizer, the actuator drum and the tens transfer mechanism of said totalizer are shown in the patent of the United States No. 2,537,471 granted to me January 9, 1951.

Mechanisms for tabulating the actuator drum are shown for example in the patent of the United States No. 2,108,596, granted to K. V. Rudin February 27, 1930.

The multiplier analyzing mechanism (Figs. 3 and 4) contains a number of cam disks 1 adapted to be set in accordance with the various digit values of the multiplier. The cam disks are mounted rotatable on a common shaft 2 and arranged to be set in a suitable arbitrary manner, for instance with the aid of levers 3. The disks are formed with a curved slot 4 forming a number of successive cam surfaces, the radial distances of which corresponding to groups of digits. One end of a three-armed follower arm 5 for each cam disk is guided by means of said slot, a pin 6 of said arm engaging the slot. The follower arms 5 are pivoted on a shaft 7. The two other arms 8 and 9 of the follower arm are adapted to cooperate with a sensing arm 10, which is pivoted and mounted displaceably on a shaft 11 paralleling the shafts 7 and 2. Every cam disk 1 is thus allotted to a follower arm 5, whereas the sensing member 10 is common to all disks and is adapted to be tabulated and moved to sensing and non-sensing positions in the successive ordinal positions by means of a mechanism hereinafter described, so that the sensing arm 10 is caused to successively read off the positions of the various follower arms 5. The shaft 11 carrying the sensing arm 10 is adapted to be displaced by a translatory movement so as to be permitted to take an operative position for the sensing arm 10, that is to say the position shown in Fig. 3, and an inoperative position for said arm, which is marked by the chain-dotted line 12. In Figs. 3 and 4 the sensing arm 10 cooperates with the follower arm 5 of the first cam disk 1.

When the cam disks 1 of the analyzing mechanism have been set they cooperate with a step wheel 13 driven from the driving motor of the machine in different directions of rotation, i. e. with positive and negative cycles in dependence on a governing device described hereinbelow, and adapted to rotate the cam disks 1 by means of teeth 14 on the latter. Provided in one end of the sensing arm 10 is a slot 15 engaged by a movable shaft 16 paralleling the shaft 2 and extending along all of the cam disks 1. The shaft 16 may thus be actuated by the sensing arm 10 irrespective of the tabulating position of said arm. With the aid of the shaft 16, the angular shifting of the sensing arm is translated to a shaft 17 paralleling the shaft 16 and connected with this latter by means of a pair of arms 18 and 19 arranged at the end portions of the shaft 16.

The governing device (Fig. 5) comprises mechanisms for controlling a cycling device for said actuator drum, for controlling the totalizer and for controlling said step wheel arrangement. Comprised in the governing device is an arm 20 rigidly connected with the shaft 17 and provided with a pin 21. During the operation of the machine, said arm is caused to take different positions corresponding to the different radial distances of the various cam surfaces of the slot 4. This is a consequence of the fact that the shaft 17 is adapted to be coupled to said curved slot by means of the members 5, 10 and 18. As mentioned above, the series of digits "0–9" are divided into groups containing one or more digits. The embodiment shown is based on a division of the series of digits into four groups, that is to say a first group containing the digit "0," a second group comprising the digits "1–5," a third group containing the digits "6–8," and a fourth group comprising the digit "9." In accordance with this system, the slot 4 of each cam disk 1 comprises four portions situated at different radial distances and connected mutually by intermediate portions. In Fig. 3, the pin 6 is in the position corresponding to the digit "0." Then follows a portion designated by 22 and corresponding to the positions of the digits "1–5." A portion 23 comprises the positions of the digits "6–8," and the end portion of the slot denoted by 24 comprises the position of the digit "9." When setting the digit "3," for example, the pin 6 is caused to engage the portion 22 of the slot 4. When the digit "7" is set, the pin 6 consequently enters into engagement with the portion 23 of the slot.

With respect to the above, the pin 21 may be caused to take four different positions designated by 221, 222, 223 and 224 corresponding to the four portions of the slot 4 situated at different radial distances. When the pin 21 is moved from the position 221 or 222 to either one of the positions 223 and 224, or vice versa, the pin will actuate an impulse device consisting of an arm 25 formed with a tongue 26 and pivoted on a shaft 27.

The governing arm 20 is provided with three different guiding slots 28, 29 and 30. The first mentioned slot serves to reverse the step wheel 13. The slot 29 has for its object to control the motor for the actuator drum and a locking arrangement for an additional single cycle of said actuator drum. The slot 30 provides for the adjusting of the totalizer for positive or negative operation.

The slot 29 guides an arm 31, which is integral with an arm 32 and is pivoted on the shaft 27. The arm 32 is located behind the arm 25 and each of these arms can when lifted actuate a contact carrying arm 33 so that the contacts in a switch 34 are closed, while a normally closed switch 35 opens. Said latter may also be opened by the turning of an eccentric 36. When the arm 20 is angularly adjusted in a counterclockwise direction and the pin 21 is moved from the position 221 towards the position 224 the arm 25 is lifted due to the engagement of the pin 21 with the tongue 26 on said arm. Hereby the switch 34 is closed and a locking arm 37, which is pivoted on a shaft 38 and tensioned by a spring 39, revolves in a counterclockwise direction and engages the outer end of the arm 25 and maintains the arm in an upper position. This happens every time the pin 21 passes the tongue 26. If, however, the arm 20 is located in the position 222 or 223 the arm 32 is held in a raised position due to the slot 29, so that the switch 34 is kept closed. As soon as the pin 21 has taken the position 221 or the position 224, the arm 32 is lowered, while the arm 25 is kept in the upper contact closing position by means of the locking arm 37. Hereby an additional single cycle of the actuator drum is obtained beyond the number of cycles determined by the slot 29 and the arm 32. The arm 25 is after said additional single cycle released by means of an eccentric 40 driven in synchronism with the actuator drum and intended to displace an arm 41 to the left. Said arm is connected by a pivot 42 with the lower part 43 of the locking arm 37 and angularly guided by means of a pin 44 inserted in a slot 45 at the end of an arm 46 which arm is rigidly connected with the arm system 31, 32. It is only when the arm 32 is in its lower position that the arm 41 is located in the path of the eccentric 40. When said latter engages the arm 41 the locking arm 37 is rocked in a clockwise direction out of engagement with the arm 25, which falls downwards to the resting position shown in Fig. 5 owing to the action of the spring urged contact carrying arm 33. Hereby the motor circuit is broken at 34 and the actuator drum is stopped.

The guiding slot 30 at the upper end of the governing arm, which adjusts the totalizer from positive to negative operation, cooperates with a pin 45 at the end of an arm 46, fixed on a shaft 47. Said shaft is shown in Fig. 8, where it carries an arm 48. A slot 49 at the end of the arm engages a pin 50 on an end wall 51 in a cradle device swingable about a pin 52 and carrying the shafts 53 and 54 of the calculating wheels 55 and 56 in the totalizer as set forth in my patent of the United States No. 2,537,471.

The guiding slot 28 (Fig. 5) of the governing arm, serving to reverse the step wheel 13, adjusts an arm 57 on a shaft 58, said arm being coupled together with one end 59 of an angle arm (Fig. 6), which is inserted in an opening 60 in the arm 57.

As shown in Fig. 6, arm 59 is pivoted on a shaft 61 integral with a downwardly directed arm 62 embraced by a circular groove 63 in the driven part 64 of a clutch connection comprised in the reversing gear for the step wheel 13, the driving parts of which consist of gears 65 and 66, rotatable on a shaft 67 in opposite directions. The part 64 can by means of the arm 62 be axially displaced on the shaft 67, which carries the step wheel 13, and be brought into engagement with one of said gears 65 and 66. The gear 65 meshes with an intermediate gear 68 (Fig. 3) meshing with a gear 69 fixed on the shaft 2, which is driven by the head motor of the machine. Said shaft 2 carries besides the cam disks 1 the actuator drum, which latter is adapted to be rotated by the shaft 2 according to the construction as set forth in my patent of the United States No. 2,537,471. The gear 66 meshes directly with a gear 70 fixed on the shaft 2.

The step wheel 13 (Fig. 6) is axially displaceable on the shaft 67 but not rotatable in relation to same. A key 71 on the shaft 67 engages a slot in the step wheel. The displacement is effected with the aid of a bow 72 firmly connected with a tabulating slide 73, which, at one end is provided with catching members 74 and 75 for the displacing sideways of the sensing arm 10, which arm, however, is carried by the shaft 11 (Fig. 3).

In Figs. 2 and 7 the tabulating slide 73 is provided with a series of teeth 76, cooperating with spring actuated pawls 77 and 78 for controlling the step-wise displacement of the slide under the action of a spring 79. The escapement is operated by means of a lever 80 connected with the pawl 78. Thus the slide 73 can be stepped to successive ordinal positions. By means of a feed pawl 81, which cooperates with a series of teeth 82 the slide can be stepped backwards to the initial position shown in Fig. 7 against the action of the spring 79. The slide is moved one step towards the initial position after each completed calculating operation in an ordinal position. The feed pawl 81 is actuated by an arm 83 pivoted on the bottom plate 88 of the machine at 84 and coupled with an arm 85, shown in Fig. 9. The feed pawl 81 is spring actuated and guided by means of a guiding edge 86 forming an edge of an aperture 87 in a bottom plate 88. The tabulating slide 73 is guided by means of two pins 89 and 90, which engages a slot 91 in said bottom plate 88.

In Fig. 9 a disk 92 is freely mounted on the shaft 2 and provided with a guiding slot 93 formed in such a way that a full stroke per cycle is obtained. A pin 94 at the end of the arm 85 engages the slot 93 which permits the feed pawl 81 to displace the slide 73 one step. The guiding slot 93 of the disk 92 also adjusts an arm 95 by means of a pin 96. Said arm is keyed to a shaft 97 arranged parallel with the shaft 2 and connected with a pair of arms 98 carrying the shaft 11 which is adapted to move the sensing arm 10 to sensing and non-sensing positions. The disk 92 is rotated clockwise by means of an auxiliary motor, the current circuit of which is controlled by the switch 35 shown in Fig. 5. When the tabulating slide 73 takes its initial position, means are actuated which turn the eccentric 36 shown in Fig. 5 and thus open the switch 35. In said initial position of the tabulating slide the sensing arm 10 in the sensing position engages a stop pin 99 (Figs. 3 and 4) which is situated in such a manner that the sensing arm 10 takes the position shown in Fig. 3 and thus the governing arm the position shown in Fig. 5.

Cam disk 92 is shown in its starting or full cycle position in Fig. 9 and preferably has suitable means associated therewith to ensure that the disk will stop at the illustrated starting position when the current to the auxiliary motor is interrupted by opening of switch 35. For this purpose, cam disk 92 may have a V-shaped notch 92a in the periphery thereof engageable by a pin 92b which is carried by a rockable lever 92c urged by a spring 92d in the direction causing pin 92b to bear against the periphery of cam disk 92. The notch 92a of the cam disk is located so that pin 92b engages therein when the cam disk returns to its illustrated starting position to yieldably resist turning of the cam disk beyond its starting position after the auxiliary motor for driving disk 92 has been deenergized by opening of switch 35.

As seen in Fig. 9, when the cam disk 92 is in its starting position, as there illustrated, arm 95 takes a position corresponding to the sensing position of the sensing arm 10, while arm 85 is retained in a position corresponding to the left end position of the tabulating pawl 81 (Fig. 2). When the arm 20 (Fig. 5) is brought to one of its end positions 221 or 224, the switch 35 is closed so that the auxiliary motor for driving disk 92 is energized and overcomes the resistance to rotation of pin 92b in notch 92a to effect rotation of the cam disk 92 in the clockwise direction. After approximately one-half revolution of disk 92 from its starting position, pin 96 of arm 95 enages in the portion of slot 93 disposed a relatively short radial distance from the axis of shaft 2, whereby arm 95 is rocked to a position corresponding to the non-sensing position of the sensing arm 10, while, at the same time, the pin 94 of arm 85 will engage in the portion of slot 93 disposed a relatively large radial distance from the axis of shaft 2 to dispose the tabulating pawl 81 at its right end position (Fig. 2) to commence the tabulation. The tabulation is completed during a further quarter of a revolution of disk 92 whereupon arm 85 is returned to its position shown in Fig. 9, but the arm 95 still remains in the position corresponding to the non-sensing condition of sensing arm 10. Upon the return of disk 92 to its starting position (Fig. 9), arm 95 is in the position corresponding to the sensing position of arm 10 and switch 35 is opened so that the pin 92b engaging in notch 92a prevents overrunning of the cam disk 92. The disk 92 is maintained in the illustrated position (Fig. 9) during the calculating operation.

It is apparent that the operation of the auxiliary motor for driving disk 92 is terminated as soon as the arm 33 (Fig. 5) is raised by means of one of the two arms 25 and 32. If the arm 20 takes the position 222 or 223 during the sensing operation, arm 32 opens switch 35 at the instant when cam disk 92 reaches the starting position of Fig. 9. The arm 20 returns to the position 221 or 224 during the calculating operation so that the switch 35 is again closed.

The main motor is started by the closing of switch 34 under the action of arms 25 or 32, and the switch 34 is maintained in the closed condition until the arms 25 and 32 assume the positions thereof illustrated in Fig. 5.

The cam disk 92 cannot stop short of its starting or full-cycle position by reason of the fact that switch 35 is maintained in its closed condition until the cam disk has reached the position where pins 92b begin to engage in notch 92a.

While the pin 94 of arm 85 does not engage in a portion of slot 93 effective to restore the tabulating mechanism to its normal condition when the disk 92 is in its starting position (Fig. 9), such restoration of the tabulating mechanism is effected after approximately one-third of a revolution of disk 92 from said starting position.

In Fig. 1 the keyboard comprises ten keys 100 for setting the actuator drum. A special key 101, which starts the machine is arranged to turn the eccentric 36 half a revolution into the position shown in Fig. 5. The amounts in the actuator drum are visible through an observation aperture 102 and the product given by the totalizer is visible through an aperture 103. The setting levers 3 of the cam disks are movable in slots 104.

The mode of operation of the machine will be explained hereinbelow in connection with a calculating example, according to which the number 2771 is taken to constitute the multiplier. The multiplicand, the numerical value of which does not effect the process of calculation, is introduced in known manner into the actuator drum. The multiplier is introduced into the first to the fourth disk 1 from the left, but this is done after that the sensing arm 10 by means of the lever 80 has been stepped five steps to the right from the end position, marked in Fig. 4 with dash-dotted lines, so that the sensing arm takes a position right underneath the arm 5 belonging to the fifth disk 1. The four disks 1 take the positions corresponding to the digits "2," "7," "7," and "1" and the fifth and the remaining disks are zeroized. The bailrod 11 is in sensing position in accordance with the position of the arm 95 as shown in Fig. 9. Upon actuating the key 101 the switch 35 is closed and the machine starts, i. e. the auxiliary motor starts and drives the disk 92 (Fig. 9) so that the sensing arm 10 at first hand is lowered and at second hand is tabulated one step to the left in which ordinal position the arm 10 is raised in order to engage the arm 5 of the fourth disk 1 sensing the nature of the digit "1." The pin 6 on said arm is in engagement with the portion 22 of the slot 4, so that the sensing arm 10 in performing the sensing operation moves the shaft 16 by one step downwardly from the position shown, while the governing arm 20 (Fig. 5) is angularly displaced by one step in a counterclockwise direction, so that the pin 21 on this arm takes the position 222. At this moment the switch 35 is opened and the switch 34 is closed by means of the slot 29 and the arm 32. The head motor starts, the amount of multiplicand is introduced into the totalizer and the shaft 67 of the step wheel 13 is rotated counter-clockwise under control of the reversing gear (Fig. 6). The step wheel 13 cooperates with one of the teeth 14 of the cam disk 1, which tooth is, through the storing position of the disk for the digit "1," in the path of the teeth of the step wheel 13 and returns the disk 1 to the initial position, that is to say, the disk is moved by one step to the zero-position. The sensing arm 10 is still in engagement with the follower arm 5, and consequently the angular displacement of this follower arm into the zero position causes a shift of the governing arm 20 in such a manner that the pin 21 again takes the position 221. Hereby the actuator drum is stopped and the first step of the calculating operation thus is completed.

Due to the fact that the switch 35 is closed concurrently with the opening of switch 34 the second step is initiated by the auxiliary motor by lowering of the shaft 11 to the position 12 and tabulation of the slide 73, so that the sensing arm 10 is tabulated to the next cam disk 1, i. e. the disk adjusted for the last digit "7" according to the example, and at the conclusion of the auxiliary motor cycle, shaft 11 is raised to the Figure 3 position and sensing arm 10 brought into the sensing position for the follower arm of this disk. The pin 6 of said arm is in engagement with the portion 23 of the slot 4. Consequently, the governing arm 20 is shifted, so that the pin 21 is moved from the position 221 to the position 223. During this shifting operation, the pin 21 has actuated the arm 25 and closed the switch 34 and opened the switch 35.

The angular displacement of the arm 20 and thus the arms 57 and 25 is utilized, first to reverse the direction of rotation of the step wheel 13 and, second, to "store" by means of the raised arm 25 one read-in impulse for the totalizer, so that the latter receives an additional read-in impulse beyond that number of steps by which the cam disk 1 operative at the time is stepped with the aid of the step wheel. The cam disk 1 which records the digit "7" is thus stepped by two steps in a direction opposed to that indicated in connection with the multiplication operation first performed, so that the portion 24 of the slot 4 corresponding to the recording of the digit "9" enters into engagement with the pin 6. As a result the governing arm 20 is angularly displaced by a further step to the left, the pin 21 thus being moved to the position 224 and the arm 32 lowered due to the shape of the slot 29. The arm 25, however, is locked in the raised position by the arm 37 and maintains the switch 34 closed during one additional revolution of the actuator drum so that the stored negative read-in impulse is obtained after the two negative read-in impulses. After said addititional revolution the eccentric 40 engages the releasing arm 41 which due to the lowered arm system 32, 46 and the locking position of the arm 37 is located in the path of the eccentric . Hereby the arm 37 is released and the arm 25 and thus arm 33 are lowered so that the switch 34 is opened and the switch 35 is closed.

The sensing arm 10 is then tabulated to the next cam disk 1, i. e. to the digit "7" first set up. The pin 21 is returned from the position 224 to the position 223. In this movement arm 25 is not raised and remains in its lowered Fig. 5 position. The cam disk 1 is stepped by two steps in the same manner as the preceding disk 1, so that the pin 6 is caused to cooperate with the portion 24 of the slot 4. Hereby the pin 21 is shifted from the position 223 to the position 224. The totalizer consequently receives two negative read-in impulses corresponding to the two stepwise advancements of the disk 1, but does not receive any additional read-in impulse, inasmuch as the arm 25 has maintained its normal, lowered position. Tabulation takes place again, and the sensing arm 10 is adjusted to read off the follower arm 5 for the disk 1 first adjusted, which records the digit "2," according to the example. Here, the pin 21 is moved from the position 224 into the position 222 and actuates the arm 25. The step wheel 13 is caused to rotate in a counter-clockwise direction, and the totalizer first receives two positive read-in impulses corresponding to the stepwise advancement of the disk 1 into the zero-position and an additional positive read-in impulse by reason of the fact that the arm 25 has been raised. As soon as the disk 1 has reached its zero-position, the governing arm 20 is shifted into the position 221, shown in Fig. 5. The arm 25 returns after the additional read-in impulse into its lower position. The switch 35 is thus closed and the sensing arm 10 is lowered and tabulated into its initial position where said arm is raised for engaging the stop pin 99. Nothing occurs because the pin 99 is situated in such a manner that the arms 10 and 20 maintain the zero positions occupied prior to tabulation and shown in Figs. 3 and 5. The multiplication process is terminated and the machine is brought to a stillstand by turning of the eccentric 36 half a revolution from the position shown in Fig. 5 which may be effected by means of transmission members actuated upon by the sensing arm 10 in its initial position.

To further elucidate the mode of operation of the machine, the terminating step of the computing cycle will be described for multiplication by a number, the highest digit value of which is constituted by any of the digits "6–9." The pin 21 will be in the starting position 223 or 224, but will always be moved to the position 224 as a final position at the stepping of the operative disk 1 to the position 24. The requisite positive read-in impulse in the next higher numerical value of the totalizer is obtained when the sensing arm 10, once tabulation has been effected, cooperates with the stop pin 99. The pin 99 being in a controlling position corresponding to zero, pin 21 is shifted from position 224 to position 221 (Fig. 5) thereby raising and latching arm 25 for a single cycle. Consequently, if the multiplier is constituted by the number "999," for example, a single negative read-in impulse is obtained for the unit digit, whereas no read-in impulse is given for the orders of tens and hundreds. On the other hand, a positive read-in impulse is obtained for the order of thousands, so that the multiplicand is multiplied by "1000," as well as by "—1."

While I have shown and described one embodiment of my invention I wish to be understood that I do not desire to be limited to the details thereof as various modifications may occur to a person skilled in the art.

I claim:
1. In a multiplier control mechanism for short cut multiplication, a rotatable actuator drum for the multiplicand, a multiplier storage mechanism comprising a number of rotatable cam disks, each disk formed with a number of successive cam surfaces the radial distances of which corresponding to respective groups of digits, means for setting said disks angularly in accordance with the various digit values of the multiplier, cog members on each disk and a step-wheel driven in time to the actuator drum and adapted to mesh with said cog members on the disk in order to turn the disk step-wise, a follower arm for each of said disks engaged with said cam surfaces, a sensing arm for sequentially sensing the angular position of said follower arms, a sensing mechanism for ordinal tabulation of said sensing arm and said step-wheel in relation to the follower arms and for moving the sensing arm to sensing and non-sensing positions, driving means for said actuator drums, driving means for said sensing mechanism, and a device under control of said sensing arm for reversing said step-wheel and for bringing both of said driving means into action alternately.

2. In a multiplier control mechanism for short cut multiplication, a rotatable actuator drum for the multiplicand, a multiplier storage mechanism comprising a number of rotatable cam disks, each disk formed with four successive cam surfaces the radial distances of which corresponding to four groups of digits, a first group containing the digit "0," a second group the digits "1" to "5," a third group the digits "6" to "8" and a fourth group containing the digit "9," means for setting said disks angularly in accordance with the various digit values of the multiplier, cog members on each disk and a step-wheel driven in time to the actuator drum and adapted to mesh with said cog members on the disk in order to turn the disk step-wise to one of two end positions corresponding to the first and last groups of digits, a follower arm for each of said disks engage with said cam surfaces, a sensing arm for sequentially sensing the angular position of said follower arms, a sensing mechanism for ordinal tabulation of said sensing arm and said step-wheel in relation to the follower arms and for moving the sensing arm to sensing and non-sensing positions, driving means for said actuator drum, driving means for said sensing mechanism, a device under control of said sensing arm for reversing said step-wheel upon the movement of the sensing arm from the position corresponding to the second group of digits to the position corresponding to the third group and vice versa and for bringing both of said driving means into action alternately and an impulse mechanism for bringing the actuator drum to perform an additional single cycle at each reversal of said step-wheel.

3. In a multiplier control mechanism for short cut multiplication, a totalizer adjustable for positive and negative operations, an actuator drum for the multiplicand, means for rotating said actuator in one direction only, a multiplier storage mechanism comprising a number of rotatable cam disks, each disk formed with four successive cam surfaces the radial distances of which corresponding to four groups of digits, a first group containing the digit "0," a second group the digits "1" to "5," a third group the digits "6" to "8" and a fourth group containing the digit "9," means for setting said disks angularly in accordance with the various digit values of the multiplier, cog members on each disk and a step-wheel driven in time to the actuator drum and adapted to mesh with said cog members on the disk in order to turn the disk step-wise to one of two end positions corresponding to the first and last groups of digits, a follower arm for each of said disks engaged with said cam surfaces, a sensing arm for sequentially sensing the angular position of said follower arms, a sensing mechanism for ordinal tabulation of said sensing arm and said step-wheel in relation to the follower arms and for moving the sensing arm to sensing and non-sensing positions, driving means for said actuator drum, driving means for said sensing mechanism, a device under control of said sensing arm for reversing said step-wheel upon the movement of the sensing arm from the position corresponding to the second group of digits to the position corresponding to the third group and vice versa and for bringing both of said driving means into action alternately, an impulse mechanism for bringing the actuator drum to perform an additional single cycle at each reversal of said step-wheel and means under control of the sensing arm for adjusting said totalizer for positive and negative operations at each reversal of the step-wheel.

4. In a multiplier control mechanism for short cut multiplication, a rotatable actuator drum for the multiplicand, a multiplier storage mechanism comprising a number of rotatable cam disks, each disk formed with four successive cam surfaces the radial distances of which corresponding to four groups of digits, a first group containing the digit "0," a second group the digits "1" to "5," a third group the digits "6" to "8" and a fourth group containing the digit "9," means for setting said disks angularly in accordance with the various digit values of the multiplier, cog members on each disk and a step-wheel driven in time to the actuator drum and adapted to mesh with said cog members on the disk in order to turn the disk step-wise to one of two end positions corresponding to the first and last groups of digits, a follower arm for each of said disks engaged with said cam surfaces, a sensing arm for sequentially sensing the angular position of said follower arms, a sensing mechanism for ordinal tabulation of said sensing arm and said step-wheel in relation to the follower arms and for moving the sensing arm to sensing and non-sensing positions, driving means for said actuator drum, driving means for said sensing mechanism, a device under control of said sensing arm for reversing said step-wheel upon the movement of the sensing arm from the position corresponding to the second group of digits to the position corresponding to the third group and vice versa, means for starting the driving means for the sensing mechanism, and means under control of the sensing arm for stopping the sensing mechanism upon the movement of the sensing arm into a sensing position corresponding to the second or third group of digits and simultaneously starting the driving mechanism for the actuator drum and an impulse mechanism for bringing the actuator drum to perform an additional single cycle at each reversal of said step-wheel.

References Cited in the file of this patent

UNITED STATES PATENTS

| | | |
|---|---|---|
| 1,580,858 | Schluns | Apr. 13, 1926 |
| 1,913,973 | Britten | June 13, 1933 |
| 1,922,971 | Mez | Aug. 15, 1933 |
| 1,968,201 | Hamann | July 31, 1934 |
| 2,081,008 | Hamann | May 18, 1937 |
| 2,170,406 | Hamann | Aug. 22, 1939 |
| 2,374,333 | Crosman | Apr. 24, 1945 |
| 2,379,877 | Britten | July 10, 1945 |
| 2,560,910 | Toorell | July 17, 1951 |